United States Patent [19]

Saeki et al.

[11] Patent Number: 4,806,376

[45] Date of Patent: Feb. 21, 1989

[54] PROCESS FOR PRODUCING A TASTE-ENRICHING SEASONING FROM BEER YEAST

[75] Inventors: Toshinori Saeki; Tadashi Mizutani; Susumu Tsujimoto, all of Kawasaki, Japan

[73] Assignee: Ajinomoto Co., Inc., Tokyo, Japan

[21] Appl. No.: 52,413

[22] Filed: May 21, 1987

[30] Foreign Application Priority Data

May 22, 1986 [JP] Japan .................... 61-118224

[51] Int. Cl.$^4$ .................... A23L 1/228; A23L 1/229
[52] U.S. Cl. .................... 426/537; 426/650; 426/655; 426/62
[58] Field of Search .................... 426/655, 650, 537, 62

[56] References Cited

U.S. PATENT DOCUMENTS

| | | | |
|---|---|---|---|
| 652,910 | 7/1900 | Peeters | 426/62 |
| 748,711 | 1/1904 | Elb | 426/62 X |
| 2,149,306 | 3/1939 | Millar | 426/655 |
| 3,627,539 | 12/1971 | Ishii et al. | 426/62 X |
| 3,914,450 | 10/1975 | Robbins et al. | 426/655 X |
| 4,472,447 | 9/1984 | Mizutani et al. | 426/650 X |

FOREIGN PATENT DOCUMENTS

| | | | |
|---|---|---|---|
| 1015647 | 2/1976 | Japan | 426/62 |
| 0109152 | 6/1984 | Japan | 426/62 |
| 1208818 | 10/1970 | United Kingdom | 426/62 |

*Primary Examiner*—Joseph Golian
*Attorney, Agent, or Firm*—Oblon, Fisher, Spivak, McClelland & Maier

[57] ABSTRACT

A process for producing a taste-enriching seasoning or a food possessing augmented richness in taste, which comprises preparing an extract of beer yeast by first extracting an aqueous suspension of beer yeast cells under conditions where no substantial decomposition of the cells occurs; subjecting the suspension to a solid-liquid separation and sterilization to produce a liquid component. The pH is adjusted to about 2–4 before the sterilization. The liquid components is then condensed and neutralized to a pH of about 4.5–7 and the beer yeast extract is added to a seasoning or food containing glutamic acid or salts of glutamic acid and nucleic acid flavoring agents. The beer yeast extract may be optionally dried to a power.

19 Claims, No Drawings

PROCESS FOR PRODUCING A TASTE-ENRICHING SEASONING FROM BEER YEAST

BACKGROUND OF THE INVENTION

1. Field of the Invention

The present invention relate to a process for producing a seasoning or food which possesses augmented richness in taste due to the addition of a water-extract of beer yeast and is free from bitterness and odor characteristic of beer yeast.

2. Discussion of the Background

Flavor-imparting functions of monosodium L-glutamic acid (MSG), sodium inosine-5'-monophosphate (IMP) and sodium guanosine-5'-monophosphate (GMP), which are typical flavoring agents, are well known. They have been widely used for the purpose of enhancing such organoleptic properties as flavor and richness in taste, in combination with hydrolysates of vegetable proteins (HVP) or animal proteins (HAP), yeast extracts (YE), amino acids, etc., depending ion their uses.

With the widespread use of such flavoring agents, it has been desired to further enhance or augment their taste-enriching functions, including the function of enhancing thickness, richness and persistence of taste, apart from the enhancement of taste based on the combined use with other flavoring agents capable of imparting saltness, sweetness, sourness, etc.

On the other hand, yeast extracts, i.e., autolysates and hydrolysates of yeast containing various amino acids and minerals, have been applied to various foods and seasonings. Yeast extracts have hitherto been produced by autolysis involving the decomposition of cells of yeast or by hydrolysis conducted under severe conditions involving treatments at elevated temperatures with the addition of chemicals for hydrolysing the yeast cells.

The inventors have previously found that water-extracts of yeast, namely extracts from yeast obtained by extraction with hot water under mild conditions where no substantial decomposition of yeast cells takes place, have unique taste-enriching effects different from those of any known combinations of flavoring agents (see Japanese Patent Application Nos. 280,981/84 and 280,982/84) and continued investigations on optimum extraction conditions, storage stability of extracts, etc. As a consequence, it has been found that extracts obtained from beer yeast by means of hot water extraction involving no substantial decomposition of yeast cells tend to assume an odor and bitterness characteristic of beer yeast and that their taste-enriching function tends to be impaired during the course of sterilization after extraction.

As far as hydrolysates and autolysates of yeast are concerned, it has been known that washing with water and supercritical gas extraction can be effective for the removal of the bitterness. It has also been proposed to subject hydrolysates and autolysates of yeast to various treatments to remove odor, such as washing with organic solvents, or to mask their odor by various means. However, nothing has been known regarding the bitterness and odor of the hot water extracts from yeast, as well as on the protection, during thermal sterilization, of the taste-enriching function of hot water extracts from yeast.

SUMMARY OF THE INVENTION

Accordingly, one object of the present invention is to provide a process for commercially producing extracts having the desired taste-enriching characteristics and yet being free from the bitterness and odor characteristic of beer yeast.

This and other objects which will become apparent from the following specification have been achieved by the present process for producing a taste-enriching seasoning or food possessing augmented richness and taste, which comprises the steps of (i) preparing an extract of beer yeast in which the preparing step comprises the steps of:

(1) extracting an aqueous suspension of beer yeast cells with water under conditions wherein no substantial decomposition of the cells takes place, (2) subjecting the suspension to solid-liquid separation and then to sterilization, or first to sterilization and then to solid-liquid separation to obtain a liquid extract, (3) adjusting the pH of the liquid extract to about 2–4 before the sterilization step, and (4) condensing and neutralizing the liquid extract to a pH of 4.5–7.0 to obtain said extract of beer yeast; and adding said extract of beer yeast to a seasoning or food containing at least one flavoring agent selected from the group consisting of glutamic acid or salts thereof and nucleic acid flavoring agents.

DETAILED DESCRIPTION OF THE PREFERRED EMBODIMENTS

After intensive investigations, it was found that the impairment of the taste-enriching function of the yeast extract caused by thermal sterilization can be inhibited and the bitterness and the yeast odor can be suppressed by lowering the pH of the extracts. The present invention has been accomplished based on this discovery.

The present invention provides a process for producing a taste-enriching seasoning or food provided with augmented richness in taste, which comprises adding an extract from beer yeast, the pH of the extract being lowered to about 2 to 4 before being sterilized, to a seasoning or food containing at least one flavoring agent selected from the group consisting of glutamic acid or salts thereof and nucleic acid flavoring agents. The invention makes it possible to attain a taste-enriching function to augment thickness, richness, persistence, etc., which cannot be attained by combinations of such flavoring agents as MSG, IMP, GMP, HAP, MVP, other YEs, etc., or by combinations of these flavoring agents with other saltness-, sweetness- or sourness-imparting flavorants.

In the first step of the present invention, a suspension of beer yeast is extracted with water under conditions where no substantial decomposition of yeast cells takes place. More specifically, a water suspension containing yeast cells is treated, for example, at a temperature of about 40° to 55° C. for a period of about 5 to 120 minutes or at a temperature of about 55° to 100° C. for a period of about 1 to 60 minutes. Desired water-extracts of beer yeast are preferably obtained under mild conditions as described above. In contrast with the prior yeast extracts, the water-extracts prepared in accordance with the process of the invention are substantially free from hydrolysis.

In the second step, the extract from the first step is subjected to solid-liquid separation by means of, e.g., centrifugation and then to thermal sterilization. The sterilization may be carried out after the separation of solids. When the sterilization is carried out after the solid-liquid separation and a pH-lowering treatment described hereinbelow, it is often required to again remove precipitates formed after the solid-liquid separation. In such a case, it may be preferred to subject the extract to a pH-lowering treatment immediately after extraction and then to a solid-liquid separation treatment to remove the precipitates formed, so as to perform the separation of solids from liquid in one single step. The sterilization is preferably carried out at a temperature of about 60° to 90° C. for a period of about 1 to 30 minutes.

The third step is a pH-lowering treatment characteristic of this invention. The pH-lowering treatment can be effected in either the first or second step described above. In either case, the pH of the extract must be lowered before the sterilization treatment. To be more specific, the pH of the extract can be lowered to about 2–4 before the extraction in the first step, before the solid-liquid separation in the second step, or before the sterilization in the second step. As an agent for lowering the pH, various organic and inorganic acids, including hydrochloric acid, sulfuric acid, lactic acid, citric acid, fumaric acid, carbonic acid and malic acid may be used. The preferred acid is hydrochloric acid. When the pH of the extract is higher than 4, the taste-enriching function of the extract may be deteriorated by various germs and the bitterness and the yeast odor could not be suppressed. On the other hand, when its pH is lower than 2, an undesirably large amount of neutralizer will be required.

In the third step, the extract obtained in the second step is condensed and neutralized. The condensation is preferably carried out at a low temperature (40° to 60° C.) for a short period of time. The temperature and the duration of condensation may be varied depending on the rate of condensation (or the density of solids). A base, such as sodium hydroxide, potassium hydroxide or ammonium hydroxide can be added to the extract to raise its pH to about 4.5 to 7.0, preferably 5.5 to 6.0, to obtain the desired beer yeast extract. If desired, the beer yeast extract may be dried to a powdered form.

The water-insoluble residues removed in the second step can be subjected to autolysis or hydrolysis by use of acids, alkalis or enzymes, so as to utilize them as ordinary yeast extracts.

There are no particular limitations on the ratio of the thus obtained water extract of yeast to the flavoring agents. It is, however, preferable to use the extract in an amount, reduced to dried mass (hereinafter referred to as "DM"), of 0.001 to 100 times that of the flavoring agents, reduced to the weight of MSG that gives the same taste level. In the case of a food, the extract is added to the food in an amount, reduced to DM, of 0.1 to 30% by weight. When the amount of the yeast extract is used in an amount exceeding the upper limit described above, an excessively thick taste may result, and the total balance of taste tends to deteriorate, although the taste can be distinctly enriched. On the other hand, when it is less than the above lower limit (less than 0.001 times that of MSG in the case of a seasoning and less than 0.1% in the case of a food), substantial taste-enriching effects may not be attained.

Flavor-imparting ingredients to be used in combination with the water-extract of the invention include MSG, IMP, GMP, potassium glutamate, calcium glutamate, potassium inosine-5′-monophosphate, calcium inosine-5′-monophosphate, potassium guanosine-5′-phosphate, calcium guanosine-5′-phosphate, and the like. It is also possible to use foods or other seasonings that contain any of the above ingredients, for example, HAV, HVP, YE, meat extracts, fish extracts, vegetable extracts, and the like.

The taste-enriching seasoning of the present invention can be prepared by any method. For example, it can be prepared by admixing the water-extract of yeast with a solution of MSG, IMP, GMP, etc., or by admixing the dried product of the yeast extract with powders of MSG, IMP, GMP, etc. It is also possible to shape them into granules, etc., together with an appropriate excipient. The food possessing enriched taste according to the invention can be prepared by any method, provided that the water extract of yeast and the flavor-imparting ingredients are both present in the food.

It is a matter of course that the other ingredients can be additionally used in the seasoning or food of the invention, without departing from the objectives of the present invention. Examples of other ingredients usable in the invention include saltness-imparting substances, such as sodium chloride and potassium chloride; sweeteners, such as sugar; sourness-imparting substances, such as organic acids, etc.; aromatics; spices; quality-improving agents, etc.

According to the present invention, taste-enriching substances which are free from bitterness and yeast odor can be readily extracted from beer yeast, and the combination of the extract and flavor-imparting ingredients is not only capable of augmenting the impression of taste without altering such original tastes as savoriness, bitterness, sweetness, sourness, saltness, etc., but also capable of enhancing the richness in taste, such as persistence, richness, thickness, etc.

Other features of the invention will become apparent during the course of the following descriptions of exemplary embodiments which are given for illustration of the invention and are not intended to be limiting thereof.

EXAMPLES

Example 1

Water was added to a slurry of beer yeast obtained as a by-product in the production of beer, and the mixture, after being well stirred, was subjected to centrifugation to give a slurry of washed beer yeast (DM=23%; pH=6.0).

To this slurry (430 kg) was added an equal amount of water, and the resulting mixture was heated at 60° C. for 10 minutes. Thereafter, it was rapidly cooled and added with 1.9 kg of hydrochloric acid to adjust its pH to 3. The resulting mixture was subjected twice to centrifugation. In the second centrifugation, 400 kg of water were added to the residue of the first centrifugation. The thus separated liquid portions were combined, and the combined liquid was sterilized at 80° C. for 5 minutes. After the completion of the sterilization, the resulting solution was condensed at 50° C. for 3 hours, and then 1.1 kg of sodium hydroxide were added thereto to raise its pH to 6.0. To this was added 5 kg of sodium chloride to give 63 kg of beer yeast extract (DM=25.3 kg; water content=60%; NaCl=6.6 kg).

As a control, an extract of beer yeast was prepared in the same manner as above, except that its pH was not adjusted, that is to say, sodium hydroxide was not added thereto.

The two kinds of beer yeast extracts thus obtained were applied to two evaluation systems set forth below, and their odor, bitterness, flavor, and richness in taste were rated. Results obtained are shown in Table 1.

Evaluation System A

MSG=0.05%; IMP=0.05%; NaCl=0.7%; and beer yeast extract=0.5% (reduced to pure extract*)

Evaluation System B

Consomme**=1.5%; NaCl=0.3%; and beer yeast extract=0.2% (reduced to pure extract*).
*: [Pure Extract]=[Solid Content]−[NaCl Content]
**: "Knor Consomme" manufactured by Knor Co.

TABLE 1

| Kind of Sample | Evaluation System A | | | Evaluation System B | | |
|---|---|---|---|---|---|---|
| | Beer Yeast Odor | Bitterness | Overall Rating | Bitterness | Flavor | Overall Rating |
| Sample according to the Invention | − | − | 0 | − | − | 0 |
| Control Sample | + | + | x with Flavor of Yeast | Imparted | | x |

Rating Used:
−: None
+: Recognized
0: Good
x: Poor

Example 2

Water was added to a slurry of beer yeast obtained as a by-product in the production of beer, and the mixture, after being well stirred, was subjected to centriguation to give a slurry of washed beer yeast (DM=23%; pH=6.0). To this slurry (430 kg) was added an equal amount of water, and the mixture was heated at 60° C. for 10 minutes. The resulting mixture was subjected twice to centrifugation in the same manner as in Example 1. The thus separated liquid portions were combined, and the pH of the combined liquid was adjusted to 3 by the addition of hydrochloric acid. Precipitates formed were filtered off (DM of the precipitates=6.0 kg). The filtrate was sterilized at 80° C. for 5 minutes and then subjected to a condensation treatment for a short period of time by use of a thin film continuous condenser (temperature of filtrate=55° C.; residue time=about 1 minute). Thereafter, 1.0 kg of sodium hydroxide was added to the condensate to raise its pH to 5.8. To this was added 5.1 kg of sodium chloride to obtain a beer yeast extract according to the invention (water content=60%; DM=25.1 kg; NaCl=6.6 kg). An aqueous solution containing 0.5% (reduced to pure extract) of the thus obtained beer yeast extract; 0.05% of MSG; 0.05% of IMP; and 0.7% of NaCl was prepared and subjected to an organoleptic test. It possessed distinct richness in taste and strong flavor, and neither bitterness not beer odor was observed.

Example 3

Water was added to a slurry of beer yeast obtained as a by-product in the production of beer, and the mixture, after being well stirred, was subjected to centrifugation to give a washed beer yeast slurry (DM=23%; pH=6.0). To this slurry (430 kg) was added an equal amount of water, and its pH was adjusted to 3.0. The resulting mixture was heated at 60° C. for 10 minutes, during which hydrochloric acid was added to the mixture to maintain its pH at 3.0 (if HCL is not added, the pH of the mixture rises due to extracts from the yeast). Thereafter, the mixture was subjected twice to centrifugation in the same manner as in Example 1, and the separated liquid portions were combined and sterilized at 80° C. for 5 minutes. After the sterilization, the combined liquid was condensed at 55° C. for 2 hours and added with 0.9 kg of sodium hydroxide to raise its pH to 6.0. To this was added 5 kg of sodium chloride to obtain a beer yeast extract (DM=21.5 kg; water content=60%; NaCl=6.2 kg). An aqueous solution containing 0.5% (reduced to pure extract) of the thus obtained beer yeast extract; 0.05% of MSG; 0.05% of IMP; and 0.7% of NaCl was prepared and subjected to an organoleptic test. It possessed distinct richness in taste and strong flavor, and neither bitterness nor beer odor was recognized.

Example 4

Taste-enriching seasonings were prepared by employing MSG, IMP, GMP and beer yeast extracts according to the present invention, in accordance with the recipes shown in Table 2. As a control, a seasoning not containing beer yeast extract was prepared. The samples were organoleptically evaluated by a two point comparison method. The results obtained are shown in Table 3.

Obviously, numerous modifications and variations of the present invention are possible in light of the above teachings. It is therefore to be understood that within the scope of the appended claims, the invention may be practiced otherwise than as specifically

TABLE 2

| Seasoning | Beer Yeast Extract Prepared in Example 1 | Beer Yeast Extract Prepared in Example 2 | MSG | IMP | GMP | Density of Aqueous Solution (%) |
|---|---|---|---|---|---|---|
| A | 2.9* g | | 0.32* g | — | — | 0.32 |
| B | 2.9 | | 0.30 | 0.02* g | — | 0.32 |
| C | 5.9 | | 0.20 | — | 0.04* g | 0.61 |
| D | 5.9 | | — | 0.12 | 0.12 | 0.61 |
| E | 2.0 | | 0.32 | 0.012 | 0.012 | 0.24 |

TABLE 2-continued

| Seasoning | Beer Yeast Extract Prepared in Example 1 | Beer Yeast Extract Prepared in Example 2 | MSG | IMP | GMP | Density of Aqueous Solution (%) |
|---|---|---|---|---|---|---|
| F | | 2.9* g | 0.32 | — | — | 0.32 |
| G | | 2.9 | 0.30 | 0.02 | — | 0.32 |
| H | | 5.9 | 0.20 | — | 0.04 | 0.61 |
| I | | 5.9 | — | 0.12 | 0.12 | 0.61 |
| J | | 2.0 | 0.32 | 0.012 | 0.012 | 0.24 |

*Reduced to pure yeast.

TABLE 3

| | A | B | C | D | E | F | G | H | I | J |
|---|---|---|---|---|---|---|---|---|---|---|
| Intensity of Flavor* | + | ++ | +++ | ± | +++ | + | ++ | +++ | ± | +++ |
| Richness in Taste* | +++ | ++++ | ++++++ | +++++ | ++++++ | +++ | ++++ | ++++++ | +++++ | ++++++ |

*± → ++++++
Increasing intensity or richness.

What is claimed as new and desired to be secured by Letters Patent of the United States is:

1. A process for producing a taste-enriching or a food possessing augmented richness in taste, which comprises the steps of:
   (i) preparing an extract of beer yeast, said beer yeast being obtained as a by-product in the production of beer, said preparing step comprising the steps of:
      (a) extracting an aqueous suspension of beer yeast cells with water under conditions wherein no substantial decomposition of said cells takes place,
      (b) separating the solid and liquid components of said suspension,
      (c) sterilizing said liquid component,
      (d) adjusting the pH of said liquid component to about 2–4, wherein said adjusting step occurs before said sterilizing step, and
      (e) condensing and neutralizing said sterilized liquid component to a pH of about 4.5–7.0 to obtain said extract of beer yeast; and
   (ii) adding said extract of beer yeast to a seasoning or food containing at least one flavoring agent selected from the group consisting of glutamic acid, salts of glutamic acid and nucleic acid flavoring agents.

2. The process of claim 1, wherein said extracting step comprises heating said aqueous suspension at a temperature of 40°–100° C. for a period of 5–120 minutes.

3. The process of claim 2, wherein said extracting step comprises heating said suspension at a temperature of about 40°–55° C. for a period of 5–120 minutes.

4. The process of claim 2, wherein said extracting step comprises heating said suspension at a temperature of about 55°–100° C. for a period of 1–60 minutes.

5. The process of claim 1, wherein said separating step comprises centrifuging said suspension.

6. The process of claim 1, wherein said adjusting step is performed before said extracting step.

7. The process of claim 1, wherein said adjusting step is performed before said separation step.

8. The process of claim 1, wherein said neutralizing is conducted before said condensing.

9. The process of claim 1, wherein said condensing is conducted before said neutralizing.

10. The process of claim 1, further comprising the steps of:
    (f) drying said extract of beer to a powder.

11. A process for producing a taste-enriching seasoning or a food possessing augmented richness in taste, which comprises the steps of:
    (i) preparing an extract of beer yeast, said beer yeast being obtained as a by-product in the production of beer, said preparing step comprising the steps of:
       (a) extracting an aqueous suspension of beer yeast cells with water under conditions wherein no substantial decomposition of said cells takes place,
       (b) sterilizing said suspension,
       (c) separating the solid and liquid components of said suspension,
       (d) adjusting the pH of said liquid component to about 2–4, wherein said adjusting step occurs before said sterilizing step, and
       (e) condensing and neutralizing said sterilized liquid component to a pH of about 4.5–7.0 to obtain said extract of beer yeast; and
    (ii) adding said extract of beer yeast to a seasoning or food containing at least one flavoring agent selected from the group consisting of glutamic acid, salts of glutamic acid and nucleic acid flavoring agents.

12. The process of claim 11, wherein said extracting step is conducted at a temperature of about 40°–100° C. for a period of about 5–120 minutes.

13. The process of claim 12, wherein said extracting step comprises heating said suspension at a temperature of about 40°–55° C. for a period of 5–20 minutes.

14. The process of claim 12, wherein said extracting step comprises heating said suspension at a temperature of about 55°–100° C. for a period of 1–60 minutes.

15. The process of claim 11, wherein said separating step comprises centrifuging said suspension.

16. The process of claim 11, wherein said adjusting step is performed before said extracting step.

17. The process of claim 11, wherein said neutralizing step is conducted before said condensing step.

18. The process of claim 11, wherein said condensing is conducted before said neutralizing.

19. The process of claim 11, further comprising the step of:
    (f) drying said extract of beer to a powder.

* * * * *